Figure 1:
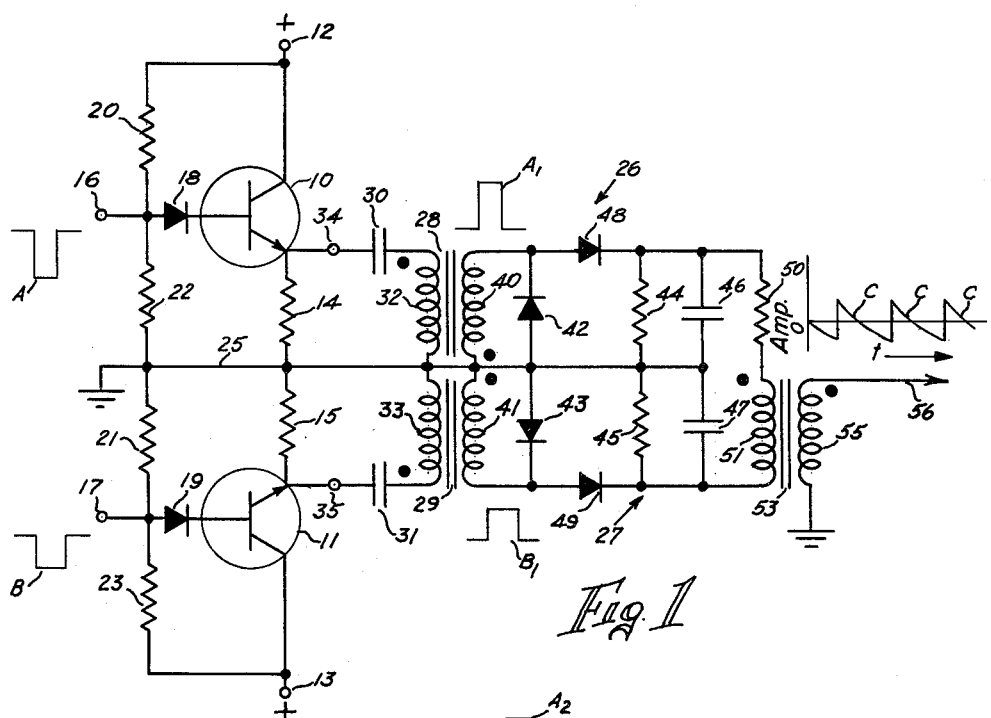

March 13, 1962

E. S. McVEY 3,025,414

DISCRIMINATOR CIRCUIT TO PROVIDE AN OUTPUT
REPRESENTATIVE OF THE AMPLITUDE AND
POLARITY OF TWO INPUT SIGNALS

Filed March 6, 1958

INVENTOR.
EUGENE S. McVEY

BY

ATTORNEYS

United States Patent Office 3,025,414
Patented Mar. 13, 1962

3,025,414
DISCRIMINATOR CIRCUIT TO PROVIDE AN OUTPUT REPRESENTATIVE OF THE AMPLITUDE AND POLARITY OF TWO INPUT SIGNALS
Eugene S. McVey, Lafayette, Ind., assignor to the United States of America as represented by the Secretary of the Navy
Filed Mar. 6, 1958, Ser. No. 719,699
7 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to discriminator circuits and more particularly to transistor discriminator circuits for the discrimination of amplitude and pulse width differences of two voltage pulse signals to produce output voltage waveforms in proportion to the algebraic sum of the two input voltage pulse signals.

Discriminator circuits using vacuum tubes are well known and well recognized in the art, and such circuits have proved to be quite successful in circuit applications. Discriminator circuits of the vacuum tube type in general provide a discrimination of the phase relationship of two or more alternating current inputs or pulsating direct current inputs to provide voltage pulses or waveforms representative of the phase relationship of the input voltages. It is also well known that vacuum tube circuits rely on the life span of the vacuum tubes in the circuit, which vacuum tubes sometimes have their life shortened by reason of vibration or transient voltages, both of which are quite often existent in movable equipment in which they are situated, such as aircraft, tanks, and ships, used for the purpose of defense.

In the present invention a discriminator circuit has been developed utilizing semiconductors widely recognized as transistors and germanium or silicon diodes which are known to be sufficiently rugged to withstand large and repeated shocks since there are no suspended elements therein, such as grid wires or heating elements, as are found in vacuum tubes. Since semiconductors are of fractional size as compared with vacuum tubes and the high voltages required therefor, the transistor or semiconductor discriminator circuit can be made of much smaller size and of much lesser weight than corresponding vacuum tube circuits, thereby providing circuit components much more desirable for aircraft, ships, and other movable or portable equipment where space and weight requirements are at a premium. In this invention a substantially symmetrical circuit arrangement is used in which two semiconductors, such as triode transistors, are symmetrically coupled with voltage biases thereon and adapted to receive pulses of predetermined pulse repetition frequency on the base of each thereof. The emitter of each transistor is transformer coupled to a pulse stretching network, which network includes a voltage storage means and a discharge means for exponentially discharging the storage means. An output circuit is coupled to both pulse stretching networks for algebraically summing the stored voltages, thus producing output signals representative of the arithmetical sum, or difference, of the amplitude and pulse width of the input voltage pulses. Since the signal input pulses may vary in amplitude, pulse width, and polarity as applied to the storing means, an algebraic summation takes place in the output summing circuit which includes the arithmetic sum or the arithmetic difference in this description. Signals in the output circuit are produced in a more useful form from the discrimination of pulse amplitude and pulse width of two input pulse voltage signals. It is therefore a general object of this invention to provide a semiconductor discriminator circuit to produce output voltage signals with amplitude and polarity representative of the relative amplitude and pulse width of two input pulse signal voltages. These output voltage signals are a measure of the relative pulse amplitude and width of the input pulse signals and are in a more convenient form for use in measurement and control circuits.

Figure 2:
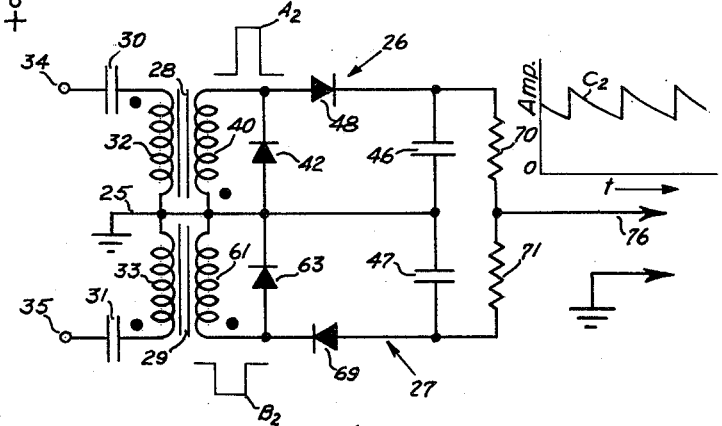

These and other objects, advantages, features, and uses may become more apparent as the description proceeds, when considered along with the preferred forms of the invention shown in the drawing, without any limitation as to the scope thereof, in which:

FIGURE 1 shows a schematic circuit diagram of one form of a semiconductor discriminator circuit of this invention to provide one desirable output signal, and FIGURE 2 shows a partial circuit diagram of FIGURE 1 in modified form to provide another desirable output voltage signal.

Referring more particularly to FIGURE 1, there is shown a discriminator circuit diagram that is symmetrical to a ground or fixed potential, with the exception of the output circuit, wherein reference characters of the even number are applied to the upper half and the next similar order numbers are applied to the lower half of the symmetrical parts for convenience in describing the invention. In this FIGURE a pair of semiconductors, such as triode transistor amplifiers 10 and 11, are used as emitter followers having the collector of each coupled to a positive direct current (D.C.) source at the terminals 12 and 13, and the emitter of each coupled through resistors 14 and 15, respectively, to a fixed potential 25, which may be a ground potential so illustrated for convenience. The terminals 12 and 13 may be connected to a single voltage source in a practical application of the invention. The base of each transistor 10 and 11 is coupled to input terminals 16 and 17, respectively, through diodes 18 and 19, respectively, preferably of the semiconductor or solid state type. The base of each transistor 10 and 11 also has a fixed bias placed thereon by means of a voltage divider circuit provided by resistors 20 and 22 for the transistor 10, and 21 and 23 for the transistor 11. The resistors 20, 22 and 21, 23 are each coupled in series from the D.C. sources to ground or fixed potential represented by the lead 25. The base of transistor 10 is coupled to the junction of resistors 20 and 22 while the base of transistor 11 is coupled to the junction of resistors 21 and 23, the diodes 18 and 19 being coupled, respectively, between these junction points and the transistor bases. While the circuit shown in FIGURE 1 illustrates these base biasing circuits as being separate for each transistor, it is to be understood that a single biasing circuit could be used for both transistor bases, as is well understood by those skilled in the art. The diodes 18 and 19 are oriented to have low forward resistance from the respective input terminal to the transistor base, and by this orientation there will be a high back resistance from each transistor base to the input terminal or the biasing circuit. By this means these diodes 18 and 19 reduce or substantially eliminate reverse base current for both transistors.

Each transistor 10 and 11 is coupled, respectively, to pulse stretching networks 26 and 27 by transformer coupling respectively, of transformers 28 and 29. The emitter of transistor 10 is coupled through a blocking capacitor 30 and through the primary winding 32 of transformer 28 to the fixed or ground potential 25, while the emitter of transistor 11 is similarly coupled through a capacitor 31, and the primary winding 33 of transformer 29 to the fixed potential 25. For convenience, as will hereinafter be more fully understood, a coupling from each emitter to the primary winding transformer circuits is through terminal points 34 and 35, respectively.

Each pulse stretching network is coupled through the respective secondary windings 40 and 41, which secondaries are each polarized oppositely to their respective primaries, as represented by the dots in accordance with engineering practice. One end of each secondary winding 40 and 41 is connected to the fixed or ground potential 25 in the same manner as the primary windings. Each secondary winding 40 and 41 is in parallel, respectively, with a unidirectional current means or diode 42, and a unidirectional current means or diode 43. Also each secondary winding 40 and 41 has a unidirectional element or diode 48 and 49, respectively, in series-parallel relation with a resistor 44 and a storage capacitor 46, and a resistor 45 and a storage capacitor 47, each diode being between the other end of the secondary winding and the junction of the elements 44, 46 and the junction of the elements 45, 47. The diodes 42, 43 and 48, 49 are preferably of the solid state type although not limited thereto. The unidirectional means 48, 49 are each oriented with the low forward resistance from the respective secondary winding to the junction point of the elements 44, 46 and 45, 47. The junction points of the elements 44, 46 and 45, 57 are coupled serially through a resistor 50 and the primary winding 51 of a transformer 53 to establish an output circuit. The output circuit is completed by the secondary winding of transformer 53 being coupled between a fixed or ground potential and the output lead 56. The transformer 53 has both primary and secondary windings oriented in the same direction to provide the polarity, as shown by the dots on this transformer.

The unidirectional elements or diodes 42, 43 are each placed in parallel in the pulse stretching network to their respective transformer secondary winding to reduce transformer overshoot at the trailing edge of the input pulse. Each of these diodes 42 and 43 is oriented with high back resistance from the transformer secondary winding to the fixed or ground point whereby any overshoot in the transformer secondary to the respective pulse stretching network in the negative direction will be prevented by forward conduction through the diode to the fixed or ground point. The capacitors 30 and 31 are each used to block direct currents conducted through their respective transistor from the D.C. voltage sources to ground through the respective resistance 14 and 15. These capacitors 30 and 31, however, will pass the pulse voltages applied to the base circuits of each transistor to be induced in the respective primary transformer windings of the coupling transformers 28 and 29. Since each coupling transformer 28 and 29 has polarity reversal therein, the voltage pulse induced in each primary winding 32 and 33 will be inverted on the respective secondary windings 40 and 41. For convenience in illustrating the invention, input voltage signal pulses A and B are shown at the input terminals 16 and 17 with the resultant voltage signal pulses appearing on the secondaries 40 and 41 of the transformers 28 and 29, as represented by the waveforms A1 and B1 in their inverted positions. The transistors 10 and 11 have a high input impedance and a low output impedance, each with approximately unity voltage gain. The low output impedance of transistors 10 and 11 is important for use in discrimination of voltage signal pulses where there is only a fraction of a microsecond maximum time for the storing capacitors 46 and 47 to charge in the pulse stretching network. The low output impedance of transistors 10 and 11 is important together with the forward impedance of the unidirectional or diode means 48 and 49 to limit the charging time constant of the pulse stretching networks. The diode means 48 and 49 perform the pulse stretching function in the pulse stretching networks. The discharge of the storing capacitors 46 and 47 is by way of resistors 44 and 45 since the back resistance of the diodes 48 and 49 is much greater than the resistance of the resistors 44 and 45. It is ideal, if possible, to have the unidirectional or diode means 48 and 49 to be substantially short circuits in the forward direction and open circuits in the reverse direction, and to go from one state to the other instantaneously. The stored voltages on the capacitors 46 and 47 will be algebraically summed (which may include arithmetic subtraction) in the primary winding 51 of the transformer 53, and the currents produced by these voltages will be limited by the resistor 50. In the particular illustrations shown in FIGURE 1, since the stored voltages will both have the same polarity, the algebraic summation in the primary winding 51 will actually be an arithmetical difference in the amplitudes of these two voltages and only this amplitude difference will transform a voltage to the secondary winding 55 for the output circuit 56. The current direction, and hence output polarity, on the output circuit 56 depends on the relative magnitudes of the stored voltages in the capacitors 46 and 47.

In the operation of the discriminator circuit, as shown in FIGURE 1, let it be assumed that gated pulses, as shown by A and B, are applied to the input terminals 16 and 17, both of these pulses being shown as negative pulses for the purpose of illustration. While these pulses A and B are shown as A having a greater amplitude than B, it is to be understood that these amplitudes may vary one with the other wherein they may be equal, or the amplitude of B may be greater than A, since it is precisely the purpose of this invention to discriminate these amplitudes for the output circuit. While the pulses A and B are preferably applied equal in point of time, exact coincidence thereof is not too important, as will become clear later in this description. The relative pulse width of the pulses A and B may likewise vary and, as more particularly pointed out later, discrimination is provided in correspondence with pulse width as well as pulse amplitude.

The transistors 10 and 11 are normally conducting direct current from the sources 12 and 13 to the fixed potential 25 through the resistors 14 and 15 by reason of the base bias through the voltage dividers 20, 22 and 21, 23, which conduction is blocked from the primary windings 32 and 33 of the coupling transformers 28 and 29 by the capacitors 30 and 31. Upon the application of the pulses A and B at 16 and 17, respectively, these pulses will pass respectively through the diodes 18 and 19 to be impressed on the bases of the transistors 10 and 11, respectively. Since the transistors 10 and 11 have substantially unity voltage gain, these pulses will appear at the respective emitters as negative pulses since voltage drops will occur in accordance with the negative pulses applied to the bases of the transistors. These pulses will pass the blocking capacitors 30 and 31 and appear across the coupling transformers 28 and 29 to produce the positive voltage pulses A1 and B1 on the secondaries 40 and 41. These pulses will each be passed in the corresponding pulse stretching networks 26 and 27 to be immediately stored on the storage capacitors 46 and 47, after which discharge will take place through the resistors 44 and 45, respectively, to the fixed potential. These stored pulses on the capacitors 46 and 47 will be arithmetically subtracted in the primary winding 51 of transformer 53, which will produce conduction in the secondary winding thereof in accordance with the amplitude and pulse width difference of the voltage pulses A1 and B1. Since, as illustrated, the input voltage signal pulse A is greater in amplitude than that of signal B, although signal B is of greater pulse width, only the arithmetical difference in the amplitude and pulse width of pulses A1 and B1 are operative to provide a voltage signal on the secondary 55 of transformer 53 proportional to this difference; that is, substantially the difference in area between pulses A1 and B1. The difference in area of the pulses A1 and B1 is accomplished by virtue of the capacitors 46 and 47 each forming an effective integrating network with the elements 48, 28, 10, and 49, 29, 11, respectively, each providing a charging impedance. The charging time constant of each effective integrating network always being greater than about five times the pulse width produces an integration of the pulses A1 and B1 thereby charging the capacitors 46 and 47 in accordance with pulse amplitude and pulse width. The output C amplitude will then be a function of the input pulses A and B in width and amplitude, or comparative areas. An arithmetic difference is involved in this illustration since both pulses A1 and B1 are of positive polarity and the difference in positive charges on the capacitors 46 and 47 will be the effective voltage discharged in the transformer 53. In the example of operation given, output pulses will be formed, as shown by C, in the time-amplitude graph above the output circuit conductor 56. The amplitude of the output pulses C is determined by the amplitude of the voltage difference between the storage capacitors 46 and 47. The frequency of the output pulses C will be equal to the pulse repetition frequency (p.r.f.) of the input pulses A and B. The output pulses C have quick rise time and slow fall time, which corresponds to the rise time on the storage capacitors 46 and 47 and the discharge time of these capacitors exponentially between the period of the pulses A1 and B1, respectively. If, for example, the pulse repetition frequency is 2,000 cycles per second, the p.r.f. of the output pulses C will be 2,000 cycles per second, and the rate of discharge of the capacitors 46 and 47 must be within this time interval between pulses. Any noise to which this circuit is subjected will be random, as is well known by those skilled in the art, but this noise will be substantially filtered out in this circuit and will have little effect.

As an example of use of the invention illustrated in FIGURE 1, amplitude and pulse width discrimination may be accomplished between gating signals, as A and B, from early and late gates or an on-target gate, and early or late gate signals of a radar ranging unit in which the output signals may be utilized for locking onto a target, which target would produce an amplitude or pulse width difference in the input signals. While this is one example of use of the subject invention, it is to be understood that it may have numerous applications where discrimination of amplitude and pulse width of two pulses are needed to produce corresponding and related output signals in useable form.

Referring more particularly now to FIGURE 2, where like reference characters are applied to like parts, the transistor circuit shown to the left of the terminal points 34 and 35 in FIGURE 1 is likewise used in combination with the partial circuit shown in FIGURE 2 coupled to the terminals 34 and 35 in FIGURE 2. The part of the circuit including the primary windings 32 and 33 of FIGURE 2 is the same as in FIGURE 1. The secondary winding 40 and its coupling to the pulse stretching network 26 is also the same in this figure. The secondary winding 61 of transformer 29 in this view is polarized in the same direction as the primary winding 33, as shown by the dots. Also in this figure unidirectional elements or diodes 63 and 69, corresponding to the diodes 43 and 49, are reversed in polarity to correspond with the polarity of the secondary winding 61 so that the diode 63 may perform its protection of overshoot, and the diode 69 may readily pass negative pulses to be stored on the capacitor 47. In this figure, resistors 70 and 71 are used as algebraic summing resistors for the output circuit 76.

The operation of the discriminator circuit of FIGURE 2 is similar to the operation of the circuit in FIGURE 1 except that when pulses, as A and B, are applied to the transistors, pulse A2 on the secondary of the coupling transformer 28 will be the same as in FIGURE 1, but the pulse B2 on the secondary 61 of transformer 29 will not be inverted but will be a negative pulse stored on the capacitor 47. Here the discharge of the capacitors 46 and 47 will be through the summing resistors 70 and 71 to produce the algebraically summed output voltage waveform or signals as shown by C2 in the time-amplitude graph above the output circuit conductor 76. The output pulses C2 may be properly called a pulsating direct current since there is a D.C. component present in the output, as distinguished from the output pulses C in FIGURE 1 which contains no D.C. component. The output C2 is a pulsating D.C. since the discharge time constant of the pulse stretching circuit is approximately twice the pulse repetition period. The pulsations of the output C2 will correspond in frequency with the input pulses at terminals 16 and 17. Such an output as shown by C2 may have particular applications in circuits such as, for example, target tracking where the input signals are gated by early, late, or on-target gating signals.

While many modifications and changes may be made in the circuit, construction, or features to produce equivalents thereof, it is to be understood that the figures are shown as illustrations only of this invention and are not limited in scope to all equivalents thereof, and I desire to be limited only by the scope of the the appended claims.

I claim:

1. A transistor discriminator circuit for discriminating between two voltage pulse signals to produce an exponential voltage output proportional to the amplitude and pulse width of the two voltage pulse signals comprising: a pair of triode transistors each having its collector coupled to a direct current supply voltage, its emitter coupled through a resistance means to a fixed potential, and its base coupled through a unidirectional element to an input terminal, each said base being biased to render the transistor conductive; the primary winding of a coupling transformer coupled between the emitter of each transistor and said fixed potential, each coupling including a blocking capacitor; a pulse stretching network coupled in parallel with the secondary winding of each said coupling transformer, one end of each secondary winding being coupled to said fixed potential, and each said pulse stretching network including a means for storing signal pulse voltages and for discharging same exponentially in the time duration between signal pulses; and an output circuit coupled by an output transformer to both of said pulse stretching networks, said output transformer passing the difference of the pulse voltages stored in said means for storing signal pulse voltages whereby the difference of the stored pulse voltages produce output pulses of a frequency equal to the input pulse repetition frequency and of an amplitude proportional to the relative amplitude and pulse width of pulses applied to the bases of the transistors.

2. A transistor discriminator circuit as set forth in claim 1 wherein each said pulse stretching network includes a unidirectional current element in parallel with the corresponding secondary winding of each coupling transformer for preventing transformer overshoot, a resistive element and a capacitive element coupled in parallel between the other end of each coupling transformer secondary winding and said fixed potential wherein said resistive element provides a discharge path for said capacitive element and said capacitive element constitutes said means for storing signal pulse voltages, and a diode serially coupled between said other end of the coupling transformer secondary winding and said resistive and capacitive elements for providing pulse stretching of pulses stored in said capacitors.

3. A transistor discriminator circuit as set forth in claim 2 wherein said transformers coupling said transistor emitters to the respective pulse stretching networks are polarized to pass pulses of the same polarity.

4. A transistor discriminator circuit for discriminating between two voltage pulse signals to produce an exponential voltage output proportional to the amplitude and pulse width of the two voltage pulse signals comprising: a pair of triode transistors each having its collector coupled to a direct current supply voltage, its emitter coupled through a resistance means to a fixed potential, and its base coupled through a unidirectional element to an input terminal, each said base being biased to render the transistor conductive; the primary winding of a coupling transformer coupled between the emitter of each transistor and said fixed potential, each coupling including a blocking capacitor; a pulse stretching network coupled in parallel with the secondary winding of each said coupling transformer, one end of each secondary winding being coupled to said fixed potential, and each said pulse stretching network including a means for storing signal pulse voltages; and an output circuit coupled by an output impedance network to both of said pulse stretching networks for discharging said means for storing signal pulse voltages exponentially in the time duration between signal pulses, said output impedance network passing the algebraic sum of the pulse voltages stored in said means for storing signal pulse voltages whereby the algebraic sum of the stored pulse voltages produce output pulses of a frequency equal to the input pulse repetition frequency and of an amplitude proportional to the relative amplitude and pulse width of pulses applied to the bases of the transistors.

5. A transistor discriminator circuit as set forth in claim 4 wherein each said pulse stretching network includes a unidirectional current element in parallel with the corresponding secondary winding of each coupling transformer for preventing transformer overshoot, a capacitive element coupled in parallel between the other end of each coupling transformer secondary winding and said fixed potential constituting said means for storing signal pulse voltages, and a diode serially coupled between said other end of each coupling transformer secondary winding and each corresponding said capacitive element for providing the pulse stretching of pulses stored in said capacitors.

6. A transistor discriminator circuit as set forth in claim 4 wherein said output impedance network consists of resistances coupled in series across the outputs of said pulse stretching networks with an output conductor taken from intermediate said resistances.

7. A transistor discriminator circuit as set forth in claim 6 wherein said transformers coupling said transistor emitters to the respective pulse stretching networks are polarized to pass pulses of opposite polarity.

References Cited in the file of this patent

UNITED STATES PATENTS

| | | |
|---|---|---|
| 2,602,889 | Post | July 8, 1952 |
| 2,797,261 | Polyzou | June 25, 1957 |
| 2,806,946 | Rich | Sept. 17, 1957 |
| 2,835,731 | Allen | May 20, 1958 |
| 2,837,665 | Edwards | June 3, 1958 |
| 2,892,953 | McVey | June 30, 1959 |